Dec. 24, 1940. W. MURAD Re. 21,673

MERCURY SWITCH

Original Filed Jan. 27, 1931 2 Sheets-Sheet 1

INVENTOR.
Walter Murad
BY
White, Prat, Flehr & Lothrop
ATTORNEYS.

Dec. 24, 1940. W. MURAD Re. 21,673

MERCURY SWITCH

Original Filed Jan. 27, 1931 2 Sheets-Sheet 2

INVENTOR.
Walter Murad

BY
White, Prat, Flehr & Lothrop
ATTORNEYS.

Reissued Dec. 24, 1940

Re. 21,673

UNITED STATES PATENT OFFICE 21,673

MERCURY SWITCH

Walter Murad, San Carlos, Calif., assignor, by direct and mesne assignments, to General Electric Company, a corporation of New York Original No. 2,142,326, dated January 3, 1939, Serial No. 511,537, January 27, 1931. Application for reissue July 20, 1940, Serial No. 346,664

12 Claims. (Cl. 200—152)

My invention relates to electric switches and is particularly applicable to a switch utilizing mercury or the like for controlling the opening and closing of the switch.

Heretofore, electric switches suitable for general domestic use, that is, switches for controlling the electrical circuits usually employed in and about places remote from the power station, have been objectionable on account of the local surges produced in the line upon operation of the switches. This characteristic is particularly objectionable when such switches are employed in the neighborhood of radio receiving sets or other electrically operated sound reproducing apparatus, since the surges set up create disturbances in the apparatus. In order to prevent arcing at the contacts, switches heretofore employed have been designed to make and break the circuit rapidly, a spring biased snap action being usually provided for effecting this result. The noise attendant upon the operation of such switches is not pleasant and frequently, as when the switches are employed in places where silence is desired, this also is a source of annoyance.

It is a general object of my invention to provide a switch which is efficient and reliable in operation.

Another object is to devise a switch in which means is provided for opening and closing a circuit relatively gradually, thereby eliminating electrical surges.

Another object is to devise a switch in which means is provided for precluding arcing at the contacts and which is, nevertheless, silent in operation.

Another object is to provide a switch utilizing mercury or the like for breaking the circuit and in which the electrical connection between the contacts is made and broken in the body of mercury.

Still another object is to provide a switch which is simple and economical in construction.

A further object is to devise a novel method of manufacturing the switch of the present invention.

These and other objects and advantages are attained in the embodiments of my invention illustrated in the accompanying drawings, in which:

Fig. 9 is a perspective view of a detail.

Figure 1:
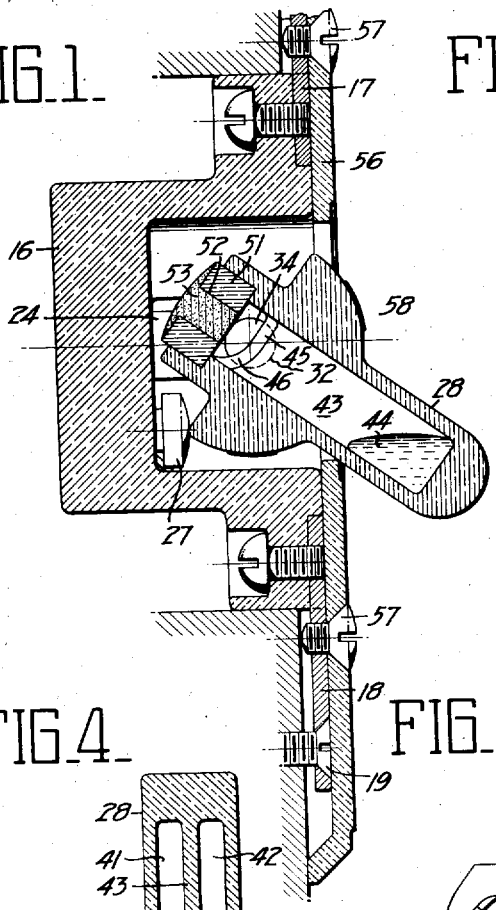
Fig. 1 is a cross sectional view taken on a vertical plane, of one embodiment of my invention, illustrating a switch of the wall type in open position.

In its preferred form the switch of my invention comprises a body of mercury which is adapted to be caused to flow into and out of engagement with one or more contacts of the switch to effect opening and closing of the circuit controlled by the switch. Preferably, means is provided for making and breaking the circuit in the body of mercury, thereby causing any arcing which does take place to occur between two points in the mercury. Also, means can be provided for causing the circuit to be made and broken gradually thereby eliminating electrical surges in the circuit.

Referring now to the drawings and first to Figs. 1 to 5 thereof, I have shown a switch of the wall type having a housing 16 formed of suitable insulating material, such as porcelain, a phenol condensate product, or the like. A pair of brackets 17 and 18 can be provided each having one or more apertures therein for the reception of screws 19 for securing the housing to a wall or other suitable support.

A pair of conducting brackets 21 and 22, each having an upstanding leg 23 and 24 preferably extending substantially perpendicular to the base of housing 16, are secured in any suitable manner to the housing 16, as by means of screws 26. The brackets 21 and 22 are provided with binding posts 27 for connecting the switch in the electrical circuit which is to be controlled by the switch.

In the embodiment illustrated in Figs. 1 to 5, the actuating member of the switch comprises a tumbler 28, mounted for rocking movement about an axis extending between the upper portions of legs 23 and 24. The tumbler 28 is preferably made hollow and is provided with a pair of conducting plugs 31 and 32 extending from the interior of the tumbler to the exterior thereof. The inner faces 33 and 34 of the plugs 31 and 32 constitute the contacts of the switch and in addition the plugs 31 and 32 can serve as trunnions for mounting the tumbler for rocking movement. For this purpose each of the plugs 31 and 32 is bevelled at its outer end, as at 36 and 37, and is journalled in a bearing formed in each of the legs 23 and 24. In the embodiment illustrated, the legs 23 and 24 have depressions 38 and 39 stamped or otherwise formed therein into which the bevelled ends 36 and 37, respectively, can extend. It is to be understood that the bearings need not be in the form of depressions and that if desired, any other suitable arrangement can be employed for journalling the tumbler for rocking movement. I have found, however, that the type of bearing shown gives good results, since wear is automatically taken up and good electrical contact between the plugs and the supporting brackets is provided at all times.

The tumbler 28 is preferably composed of moldable insulating material, such as a phenol condensate product, and the hollow compartment formed therein is shown as being divided into two parts 41 and 42 by a partitioning wall 43 extending longitudinally through the handle of the thumbler. A quantity of mercury 44 is disposed within the compartment and when the switch is mounted in operative position, the mercury can be caused to flow from one end of the tumbler to the other upon rocking movement thereof. For example, when the tumbler is rocked to the position illustrated in Fig. 1, the mercury flows to the outer end of the handle and when it is rocked to the position shown in Fig. 2, the mercury flows to the inner end.

Figure 2:
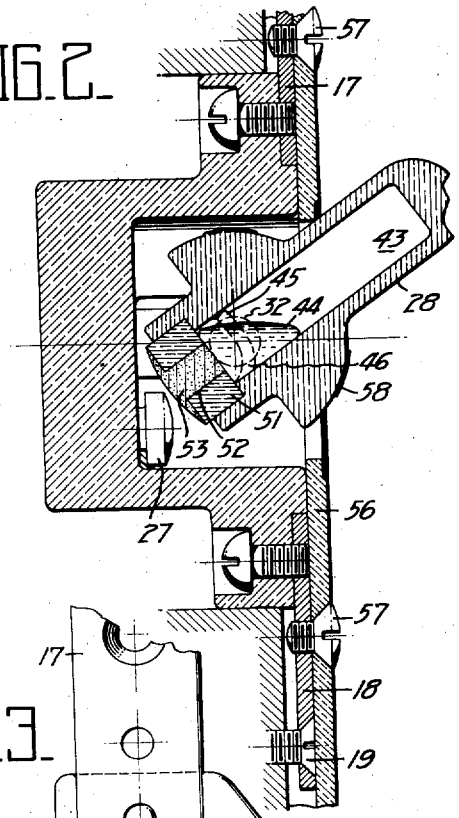
Fig. 2 is a similar view showing the switch illustrated in Fig. 1 in closed position.
Figure 4:
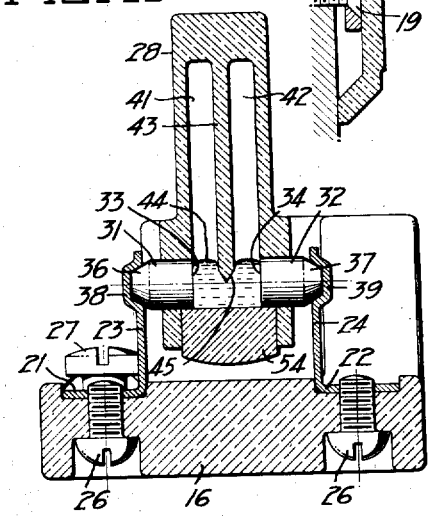
Fig. 4 is a cross sectional view taken on line 4—4 of Fig. 3.
Figure 3:
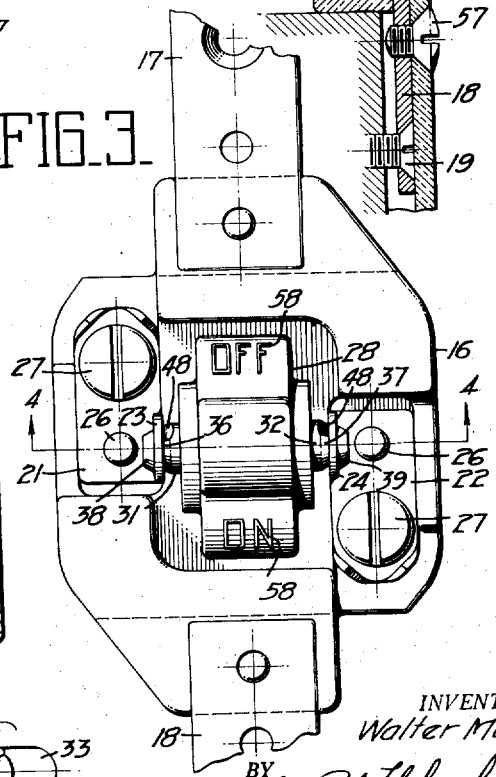
Fig. 3 is a front elevation of the switch with the cover removed to show the construction.
Figure 5:
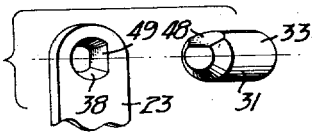
Fig. 5 is a view showing certain details of the device.

When the tumbler is in the position shown in Fig. 2, the mercury takes the form of a single globule since the partitioning wall in the handle preferably does not extend as far as the inner end wall of the compartment. When the tumbler is tilted to the position shown in Fig. 1, however, the mercury is divided into two parts by the partitioning wall, one part flowing into compartment 41 and the other part flowing into compartment 42. As shown in Figs. 2 and 4, when the mercury is at the inner end of the tumbler, it engages both contacts 33 and 34 thereby serving to complete an electrical circuit in which these contacts may be included. It will also be noticed that when the tumbler is rocked to the position shown in Fig. 1, the mercury flows away from the contacts thereby breaking the circuit.

Preferably, the inner edge of the partitioning wall 43 is disposed between the contacts 33 and 34, as shown in Figs. 2 and 4, so that as the mercury recedes from the inner end of the tumbler it is divided into two portions before it has left either one of the contacts 33 and 34. In a similar manner, when the mercury is flowing toward the contacts, the globule of mercury in compartment 41 makes engagement with contact 33 and the globule of mercury in compartment 42 engages contact 34 before the two globules of mercury have reached the position where they flow together to form a single globule. By providing means of this character for parting the mercury upon opening the switch before the mercury has left either contact and for causing the mercury to make engagement with both of the contacts 33 and 34 before it is permitted to flow together on the closing of the switch, the circuit will be made and broken within the body of the mercury. Thus, no arcing can possibly occur at the surfaces of the contacts 33 and 34 and any arcing which may take place must occur in the body of the mercury.

The inner edge 45 of the partitioning wall 43 is preferably bevelled or sharpened and is in the form of a knife edge so that at the instant the mercury is separated or reunited, as the case may be, the change is effected smoothly and gradually. As the mercury recedes from the contacts 33 and 34 upon tilting of the tumbler, the effective cross section through the body of mercury decreases gradually, thereby increasing the resistance between the contacts. The rate of change in the cross section of the mercury during this movement can be accurately controlled by suitably shaping the knife edge 45 and I have shown a curved portion 46 on the knife edge for this purpose. Thus, the current in the circuit is gradually reduced to a minimum value before the circuit is finally broken. At the instant of final break, the current has reached its minimum value and any arcing which may occur will necessarily be of little consequence.

At the instant of separation, the surface tension of the mercury causes the separated globules to withdraw violently from one another, thereby abruptly breaking the circuit. Thus, not only is the arcing which may occur of small magnitude, but it is also of extremely short duration. Experiments have shown that the amount of arcing is negligible in switches constructed in accordance with this invention and that the quality of radio reception, for example, is not disturbed in the slightest by the operation of such switches, even when employed under the most adverse conditions.

Since the elimination of arcing in the present switch is not dependent upon the rapidity of movement of the actuating member, no provision need be made for biasing the member toward open and closed positions. The structure can be materially simplified, therefore, by omitting the usually complicated mechanism ordinarily employed for this purpose. Consequently, the switch is absolutely silent and free of all mechanical noises.

Suitable means can be provided, if desired, for retaining the switch in either one or both of its operating positions. Thus, in Fig. 5 I have shown a flat surface 48 formed on the bevelled end of trunnion 31 which is adapted to cooperate with a complementary flat surface 49 in the bearing 38 for retaining the switch in one of its actuated positions. This expedient can also be employed in the other trunnion 32 to reinforce the holding effect or, if desired, one of the trunnions can be provided with a surface which serves to hold the switch "on" while the other can have a surface to hold the switch off."

For precluding oxidation or other deterioration of the mercury, the compartment or bore within the tumbler 28 can be filled with some inert gas or, if desired, it can be partially evacuated. For ordinary conditions I have found that a rarefied atmosphere of air gives very good results.

In manufacturing the tumbler 28, I prefer to employ a moldable insulating material, such as a phenol condensate product, which can be molded to the desired shape directly above the trunnions 31 and 32 and with the partitioning wall 43 formed integrally within the handle of the tumbler. The open end of the tumbler can have secured therein, in any suitable manner, a plug 51 of insulating material having an opening 52 for evacuating the compartment after the mercury has been deposited. After the chamber has been evacuated sufficiently, the opening 52 can be sealed with sealing wax 53 or any other suitable non-conducting sealing material.

The preferred method of manufacture, however, is to heat the tumbler and the mercury which is placed therein, thereby expanding the tumbler and heating the air in the compartment. While the tumbler is still in heated condition, an unheated solid plug 54, shown in Fig. 4, can be forcibly inserted in the open end of the tumbler. Upon cooling, the tumbler will contract about the plug, thereby holding it securely in place and the contraction of the air upon cooling will produce the desired rarefied atmosphere. Under some circumstances, I have found that the presence of a small amount of carbon in the mercury, in the neighborhood of about one per cent (1%), has a beneficial influence.

The legs 23 and 24 are formed of metal having good electrical conductivity and preferably having sufficient resiliency to support the tumbler 28 without further aid. Brass or hard drawn copper are satisfactory, but it is to be understood that practically any other metal can be employed. In view of the inherent ruggedness of the switch and the entire absence of breakable parts, the possibility of failure is extremely remote. However, if for any reason it is desired to replace the tumbler 28, the construction permits easy withdrawal thereof and a new tumbler can be readily snapped into place, thereby reconditioning the switch without disturbing any wiring in the circuit.

The usual wall plate 56 can be disposed over the front side of the switch and secured thereto, as by means of screws 57. The tumbler 28 can have molded or otherwise formed thereon, suitable legends 58 to indicate the open or closed condition of the switch.

In the embodiment illustrated in Figs. 1 to 5 and which has been described above, it will be noticed that the mercury in flowing to and from the contacts changes its position relative to the axis of rotation of the tumbler 28. In Figs. 6 to 9, I have illustrated a modification in which the mercury remains substantially stationary relative to the axis of rotation of the actuating member while the switch contacts can be moved into and out of engagement with the mercury. The general principle of operation, however, is substantially the same as in the embodiment heretofore described.

Figure 6:
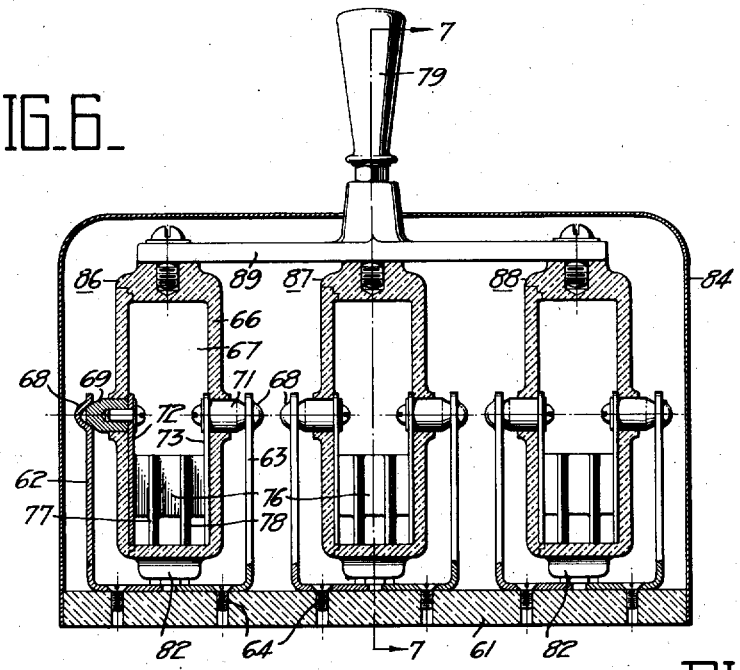
Fig. 6 is a cross sectional view of a modification in which the body of mercury employed in the switch remains relatively stationary and the contacts are movable into and out of engagement with the mercury. In this figure one manner is illustrated in which a plurality of switches of the type disclosed can be mounted within a single housing.
Figure 7:
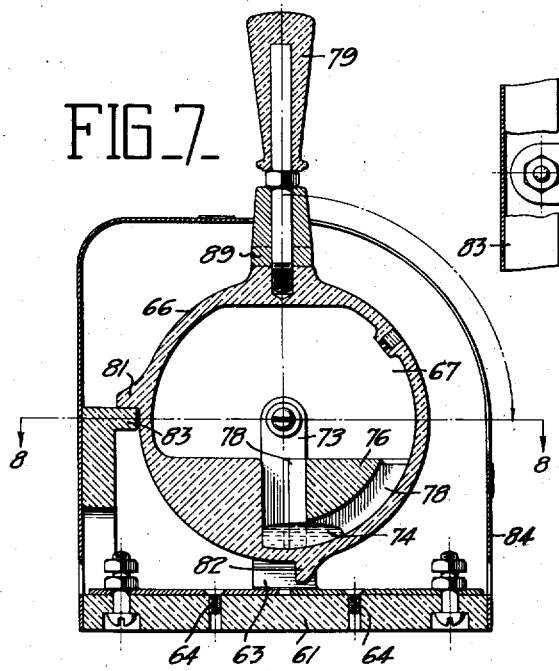
Fig. 7 is a cross sectional view taken on line 7—7 of Fig. 6.
Figure 8:
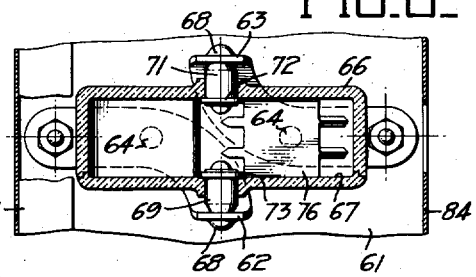
Fig. 8 is a cross sectional view taken on line 8—8 of Fig. 7.
Figure 8:
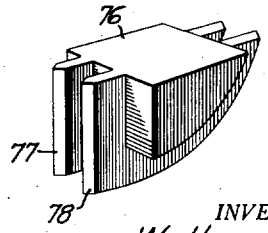

Referring now to Figs. 6 to 8, I have shown a switch having a base 61 to which a pair of conducting brackets 62 and 63 are secured, as by means of screws 64. The movable member 66 of the switch can be of a general cylindrical shape and can have a compartment 67 therein. The member 66 is provided with trunnions 69 and 71 and is journalled for rocking movement in bearings 68 formed in or carried by the brackets 62 and 63.

The trunnions 69 and 71 are preferably made of conducting material and extend from the exterior of the member 66 into the compartment 67. Electrically connected to the trunnions are conducting strips 72 and 73 which can be disposed against opposite sides of the chamber 67. The strips 72 and 73 extend to a point near the peripheral wall of the chamber 67 and rotate with the member 66 as it is rocked from one position to another.

A quantity of mercury 74 is disposed within the compartment 67 and when the conducting strips 72 and 73 are rocked to the position shown in Fig. 7, they are electrically connected together through the body of mercury. Upon rocking the member 66 in a clockwise direction, as viewed in Fig. 7, the conducting strips 72 and 73 are withdrawn from the mercury, thereby opening the circuit. During this rocking movement, the mercury 74 remains at the lower end of the compartment and its position is substantially stationary relative to the axis of rotation of the member 66.

For parting the mercury 74 so that the circuit is made and broken within the body of the mercury, a severing member 76 is provided which has formed thereon one or more severing blades 77 and 78. In the embodiment illustrated, two blades are shown, whereby the mercury is severed into three parts. The operation of the blades 77 and 78 is similar in every respect with the operation of the partitioning member 43, heretofore described in connection with the other embodiment.

For rotating member 66 a suitable handle 79 can be provided and if desired, suitable stops 81 and 82 can be provided on member 66 which are adapted to cooperate with a fixed stop 83 for limiting the rocking movement of member 66.

In Fig. 6 I have illustrated one manner in which a plurality of switches of the type described can be mounted within a single housing 84 for simultaneous operation. Thus, three, switches 86, 87 and 88 have been shown linked together, as by means of a bar 89, and are all operable upon actuation of a single handle 79. When all three switches are connected in parallel and to control the same circuit, the resulting switch is suitable for heavy duty, since the current in the circuit divides through the three switches. Also, by a similar construction, a multiple switch can be provided merely by shifting the phase relationship of the actuating members 66 on the different switches so that each switch operates in succession as the actuating handle 79 is moved from one of its extreme positions to the other. For example, the phase relationship between the switches can be such that the switch 86 closes when the handle is in its vertical position, as shown in Fig. 7, while switch 87 closes when the handle is thirty degrees removed from this position and switch 88 closes when the handle is sixty degrees removed from its original position, and all of the switches can be in open condition when the handle is in its horizontal position. In this manner any number of switches can be mounted for simultaneous operation and by suitably connecting the various switches into different electrical circuits, a wide variety of useful combinations can be produced.

While I have shown and described certain preferred embodiments of my invention, I do not wish to be limited thereto, since the invention as defined in the appended claims can be embodied in a plurality of other forms.

I claim:

1. In an electric switch, a housing having a recess therein, means adjacent the front of said housing for mounting said housing on a support, a wall plate having an aperture therein, means for fastening said plate on said mounting means, resilient legs in said recess, and a tumbler insertible through said aperture and adapted to be gripped by said legs.

2. In an electric switch, a housing having a recess therein, a wall plate having an aperture therein adapted to overlie said recess, resilient legs in said recess, a tumbler partially disposed in said recess and projecting through said aperture, and plugs on said tumbler releasably engaging said legs, said tumbler being adapted to pass bodily through said aperture when said legs and said plugs are released.

3. In an electric switch, a frame providing a recess, a plate having an aperture therein adapted to overlie said recess, a tumbler adapted to pass bodily through said aperture and to be partially disposed in said recess, plugs on said tumbler, and resilient legs on said frame adapted releasably to engage said plugs.

4. In an electric switch, a frame providing a recess, a plate having an aperture therein adapted to overlie said recess, a hollow tumbler adapted to pass bodily through said aperture and to be partially disposed in said recess, electrically conducting plugs in said tumbler, mercury partially filling said hollow tumbler and adapted to control electric flow through said plugs, and a pair of resilient electrically conducting legs on said frame and providing releasable pivotal supports for said plugs.

5. In an electric switch, a frame, a plate having an aperture therein adapted to overlie said frame, a hollow tumbler adapted to pass through said aperture and to be partially disposed in said recess, electrically conducting plugs in said tumbler, mercury partially filling said hollow tumbler and adapted to control electric flow through said plugs, and a pair of electrically conducting legs on said frame and providing with said plugs a releasable pivotal connection between said frame and said tumbler.

6. In an electric switch, a housing having a recess therein, a planar wall plate having an aperture therein overlying said recess, a pair of electrically conducting legs in said recess, electrical terminals on said legs, a hollow tumbler adapted to pass bodily through said aperture and to be partially disposed in said recess, electrically conducting plugs in said tumbler and providing with said legs a releasable pivotal connection between said housing and said tumbler, and means in said hollow tumbler dependent upon the pivotal position of said tumbler for making and breaking an electrical circuit between said plugs.

7. A switch comprising a wall plate adapted to be mounted substantially flush with the wall, a tumbler having a base portion positioned behind the wall plate and having an elongated portion projecting through said plate to provide a handle, said tumbler having a bore through its base portion and extending to its handle portion, contacts in the base, a body of mercury in the tumbler for bridging the contacts, and a fusible plug in the base of the tumbler and closing said bore.

8. A switch comprising a recessed frame, brackets terminating in bearings and mounted in the recess of said frame, a wall plate flush with the wall and covering said frame, a tumbler having trunnions journaled in the bracket bearings and extending in a handle through the wall plate, said tumbler having a longitudinal bore extending between the trunnions into the handle, contacts in the bore electrically connected with said trunnions, a body of mercury in the tumbler for bridging the contacts, and a fusible plug in the tumbler and closing said bore.

9. A switch comprising resilient brackets terminating in bearings, a hollow tumbler, trunnions on the tumbler journaled in the bracket bearings, contacts in the tumbler connected with said trunnions, a body of mercury in the tumbler for bridging the contacts, the bearing surfaces between the trunnions and brackets being tapered so that pulling on the tumbler causes the brackets to spring outwardly to release the tumbler.

10. A mercury switch comprising a wall plate, a tumbler having a base portion positioned behind the wall plate and having an elongated portion projecting through the plate to provide a handle, said tumbler having a bore through its base to provide a mercury chamber, contacts in the base, a body of mercury in the tumbler for bridging the contacts, and a fusible plug in the base of the tumbler and closing said bore.

11. In an electric switch, spaced contacts having opposed surfaces, and a liquid contact circuit closer between said contacts and having terminals frictionally engaging said opposed surfaces, said terminals and said opposed surfaces having complementary ball and socket portions whereby said circuit closer is rotatable about the axis of its terminals, the contacting surfaces of said portions being inclined with respect to the axis of rotation of the circuit closer.

12. In an electric switch, a liquid contact circuit closer, and supports having opposed surfaces on opposite sides of said circuit closer, said surfaces and said circuit closer having complementary ball and socket portions whereby said circuit closer is rotatable about its axis, the contacting surfaces of said portions being inclined with respect to the axis of rotation of the circuit closer.

WALTER MURAD.